Aug. 14, 1928.
E. A. KUEN
1,681,042
CLOSURE FASTENING
Filed July 28, 1924     2 Sheets-Sheet 1
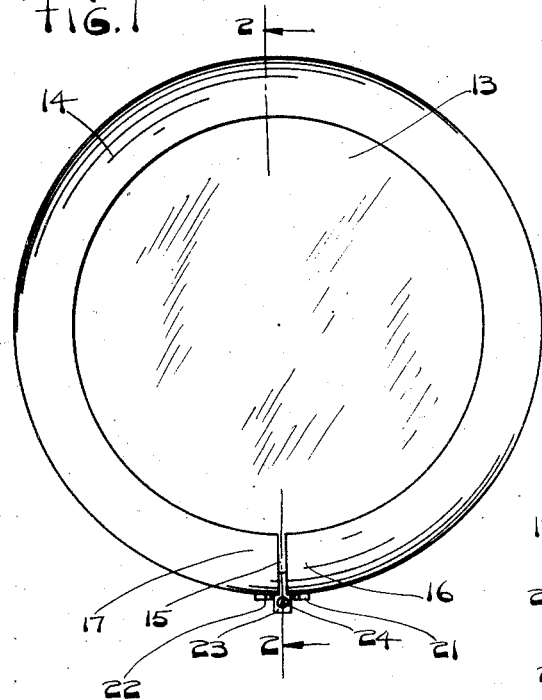
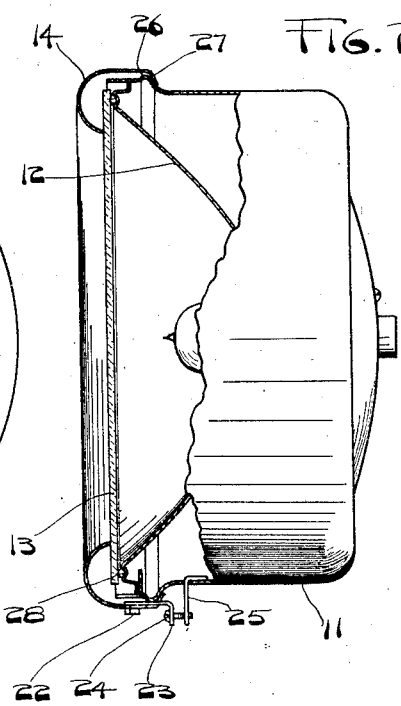
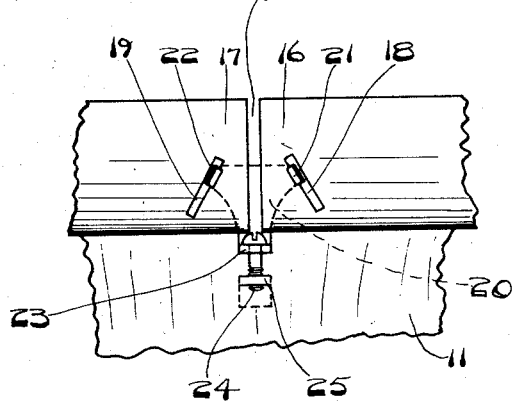
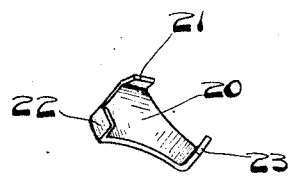
INVENTOR
Eugene A. Kuen
BY Thornton Bogert
ATTORNEY Aug. 14, 1928.
E. A. KUEN
1,681,042
CLOSURE FASTENING
Filed July 28, 1924     2 Sheets-Sheet 2
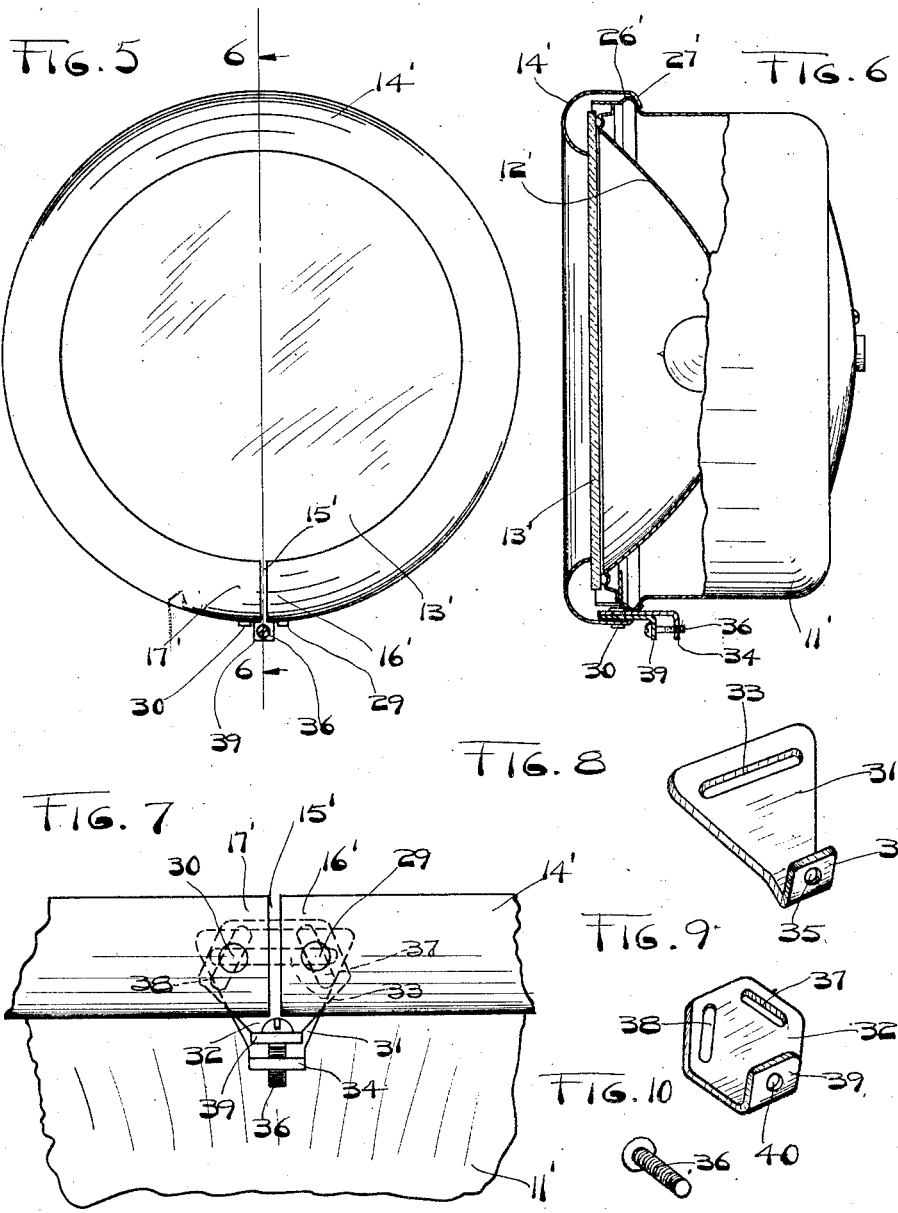
INVENTOR
Eugene A. Kuen
BY Thornton Rogert
ATTORNEY Patented Aug. 14, 1928.

1,681,042

UNITED STATES PATENT OFFICE.

EUGENE A. KUEN, OF CINCINNATI, OHIO, ASSIGNOR TO THE THOMAS J. CORCORAN LAMP COMPANY, OF CINCINNATI, OHIO, A CORPORATION OF OHIO.

CLOSURE FASTENING.

Application filed July 28, 1924. Serial No. 728,625.

This invention relates to a closure fastening which is particularly adapted to automobile lamps and which has for an object to produce a closure fastening in which a cheap and effective means is provided for securing the closure of an automobile lamp in position with a minimum effort and the simplest of fastening operations.

A further object is to produce an automobile lamp closure fastening which will operate to secure the lamp closure against vibration relatively to the other elements of the lamp and which will operate to secure the closure against the closure glass in such a manner that the reflector and lamp construction is effectively sealed against the admission of dust and moisture thereto.

These and other objects are attained in the closure fastening described in the following specification and illustrated in the accompanying drawings, in which:

Fig. 1 is a front elevation of a lamp having a closure fastening embodying my invention.

Fig. 2 is a side view of a lamp embodying my improved closure fastening and taken somewhat upon the line 2—2 of Fig. 1.

Fig. 3 is a fragmental under side view of the lamp closure fastening embodying my invention and taken on an enlarged scale.

Fig. 4 is a perspective view, upon an enlarged scale, of a detail of my invention as I have shown it in Figs. 1, 2 and 3.

Fig. 5 is a view similar to that shown in Fig. 1 but of a modified form of closure fastening embodying my invention.

Fig. 6 is a view similar to Fig. 2, but taken on the line 6—6 of Fig. 5.

Fig. 7 is a fragmental under side view of the form of lamp fastening shown in Fig. 6, but taken upon an enlarged scale.

Figs. 8, 9 and 10 are perspective views, upon an enlarged scale, of details of the lamp fastening shown in Figs. 5, 6 and 7.

The form of my invention shown in Figs. 1 to 4 inclusive will now be described. The lamp I have shown and to which my invention has been applied, consists of the usual lamp body 11 which has a reflector 12 mounted therein and is provided with a closure glass 13, with the opening of the body, reflector and glass surrounded by a closure rim 14. The rim 14 is split so as to provide a kerf 15 at the bottom. In the ends 16 and 17 of the rim, formed by the kerf, I have provided inclined slots 18 and 19 respectively. The slots are so inclined that they converge toward the front of the rim. I have provided a latch 20 which has projecting lugs 21 and 22 so positioned as to engage the slots 18 and 19 respectively. These lugs are inclined toward one another so as to be retained in the slots and to prevent disengagement of the ends 16 and 17 from the lugs. In addition to lugs 21 and 22 I have provided a central lug 23 which has an aperture therein through which a screw 24 is adapted to pass and the lamp body 11 is provided with a lug 25 which has a screw threaded aperture for cooperation with the screw threads of screw 24. Thus, as will be seen by reference to Fig. 3, when screw 24 is rotated in order to draw the ends of the rim toward one another, the lugs 21 and 22 will move through slots 18 and 19 and thus effect a contraction of the rim. In order that the rim may be caused to grip the body tightly during the contracting movement thereof, I have provided a bead 26 adjacent to the open end of the body and in cooperation therewith I have provided an inwardly turned rear edge 27 upon the rim 14. The inclination of the rear wall of the bead 26 and the corresponding inclination of the edge 27 will bring about a tightening movement or pressure of the rim upon the glass 13 by causing the rim to move rearwardly, or at least to have a tendency to move rearwardly and it will thus bring about a yielding pressure of the rim upon the glass 13 and operate to hold the glass in sealing engagement with the packing ring 28 of the reflector opening. Thus, by an axial movement of the latch I have brought about a circumferential contraction of the closure rim and by means of the inclined walls of the bead 26 and edge 27 I have again translated this motion to an axial movement of the closure rim in order to bring about a sealing pressure of the rim upon the closure glass and in this manner to exclude dust and moisture from the polished interior surface of the reflector, as well as to hold the glass, reflector and body in vibrationless fastened position relatively to one another.

The modified form of my invention, which I have illustrated in Figs. 5 to 10 inclusive, consists of the lamp body 11′, the reflector 12′, which is located within the lamp body, the closure glass 13′ which closes the reflector, and the rim 14' which closes the lamp and retains the closure glass and reflector against displacement. The rim 14' is provided with a kerf 15' at its bottom, thus forming two ends 16' and 17' upon the rim. In the ends 16' and 17' I have mounted the respective rivets 29 and 30 which operate as pins for bringing about rim contraction in a manner which I will now describe. In this modified construction I have provided two latches 31 and 32, the former of which I will term the stationary latch and the latter the movable latch. The stationary latch is provided with an elongated slot 33 which extends in circumferential alignment with and is engaged by the shanks of pins 29 and 30. This allows contractual movement of the ends of the rim relatively to one another and yet prevents axial movement of the latch with respect to the rim. Formed on the latch at the rear thereof is a lug 34 in which a screw threaded aperture 35 is provided for the correspondingly threaded screw 36. Located between latch 31 and the ends 16' and 17' of the rim is the latch 32. This latch is provided with two slots 37 and 38 which are inclined relatively to one another and which converge toward the front of the rim. These slots are engaged respectively by the shanks of pins 29 and 30. At the rear of latch 32 a lug 39 is provided for cooperation with lug 34 of latch 31. Lug 39 has a plain aperture 40 for the passage therethrough of screw 36 the positions of the parts relatively to one another being shown plainly in Figs. 6 and 7.

Thus when screw 36 is rotated it will cause latch 32 to move relatively to latch 31 and bring about rearward movement of latch 32. The latch 31 will act somewhat as an abutment by reason of the engagement of pins 29 and 30 with slot 33. This abutment action is made use of to cause latch 32 to be drawn rearwardly by screw 36. By reference to Fig. 7 it will be seen that rearward movement of latch 32 will bring about a drawing toward one another of the pins 29 and 30 by reason of the engagement of these pins with the respective slots 37 and 38. During the movement of these pins toward one another they will travel in the straight slot 33. Thus the closure rim is contracted and caused to be brought into gripping engagement with the body by having its rear inclined edge 27' brought into engagement with the rear inclined surface of body bead 26'. This action, as in the action of the construction previously described, will cause the forward edge of closure rim 14' to engage closure glass 13' with a yielding pressure which is sufficient to effect a sealing of the reflector 12' against the admission of dust and moisture thereto. At the same time this circumferential contraction of the closure rim together with its tendency to rearward axial movement, will operate to retain the several elements of the lamp against displacement or relative vibration. As in the previously described construction the operation of my improved closure fastening will be such that the original axial movement of the movable latch will be translated into a circumferential contraction of the rim in a movement transversely of the lamp axis and this circumferential contraction will again be translated into an axial movement by the operation of the rear edge of the rim in engagement with the rear face of the body bead.

In the construction I have previously described the fastening of the closure upon the body depends upon the body lug in cooperation therewith, so that the body and closure rim have to be especially constructed to render them adaptable to mutual cooperation. In the construction disclosed in Figs. 5 to 10 inclusive the rim and its contracting mechanism form a complete unit which does not depend upon the body to enable it to perform its rim contracting operation. The constructions which I have thus described are quite simple, are easily assembled and are quite cheaply produced, thus rendering them readily adaptable to commercial production.

Having thus described my invention what I claim is:

1. A closure fastening in combination with a lamp body, a reflector located in the body, a closure glass adapted to cover the reflector opening, a split closure rim embracing the open end of the lamp body and engaging the closure glass adjacent to its periphery, the ends of the rim having lugs thereon, and a latch having slots therein oppositely inclined to one another and engaged by the lugs, said slots being adapted to effect movement of the lugs therein when the latch is moved.

2. A closure fastening in combination with a lamp body having a circumferential bead formed adjacent to its open end, a reflector located in the body, a closure glass adapted to cover the reflector opening, a split closure rim embracing the open end of the lamp body and having an inclined rearwardly extending bead engaging edge, and means having pin and inclined slot engagement with the rim and movable in a direction axially of the lamp body, to contract the rim upon the body to bring its inclined edge into cooperative engagement with the bead, whereby the rim will be drawn toward and into engagement with the closure glass.

3. A closure fastening in combination with a lamp body, a reflector located in the body, a closure glass adapted to cover the reflector opening, a split closure rim embracing the open end of the lamp body, adapted to be contracted thereon, and engaging the closure glass adjacent to its periphery, pins in the ends of the rim, a latch having slots occupied by the pins and extending in directions at an angle to the contracting movement of the rim, and means adapted to move the latch in a direction at an angle to both the slots and the direction of contracting movement of the rim.

4. A closure fastening in combination with a lamp body, a reflector located in the body, a closure glass adapted to cover the reflector opening, a split closure rim embracing the open end of the lamp body and engaging the closure glass adjacent to its periphery, pins extending from the ends of the rim, and a latch in cooperation with the pins on the rim, said latch consisting of two members and means adapted to move one of said members relatively to the other of said members, the second mentioned of said members having ways extending in the direction of contraction of the rim and occupied by the pins, the first mentioned of said members having movement at right angles to the direction of contraction of the rim and containing ways extending in directions at an angle to the directions of movement of both itself and the rim, said ways being occupied by the pins, whereby when the means is operated the movement of the first mentioned member will effect contraction of the rim upon the body and against the glass.

In testimony whereof I have hereunto affixed my signature.

EUGENE A. KUEN.